United States Patent
Kell et al.

(10) Patent No.: US 9,409,262 B2
(45) Date of Patent: Aug. 9, 2016

(54) MATERIAL REMOVAL METHOD

(71) Applicant: ROLLS-ROYCE PLC, London (GB)

(72) Inventors: James Kell, Nottingham (GB);
Samantha Helen Davies, Manchester (GB); Dragos Axinte, Nottingham (GB); Mark Daine, Nottingham (GB)

(73) Assignee: ROLLS-ROYCE plc, Derby (GB)

( * ) Notice: Subject to any disclaimer, the term of this patent is extended or adjusted under 35 U.S.C. 154(b) by 315 days.

(21) Appl. No.: 14/156,895

(22) Filed: Jan. 16, 2014

(65) Prior Publication Data
US 2014/0223737 A1    Aug. 14, 2014

(30) Foreign Application Priority Data

Feb. 12, 2013 (GB) .................... 1302428.6

(51) Int. Cl.
  *B23P 6/00* (2006.01)
  *F01D 5/00* (2006.01)
  *B23K 26/36* (2014.01)
  *B23K 26/40* (2014.01)

(52) U.S. Cl.
  CPC ............. *B23P 6/002* (2013.01); *B23K 26/0622* (2015.10); *B23K 26/362* (2013.01); *B23K 26/40* (2013.01); *F01D 5/005* (2013.01); *B23K 2201/001* (2013.01); *B23K 2203/50* (2015.10); *F05D 2230/13* (2013.01); *F05D 2230/80* (2013.01); *Y10T 29/49318* (2015.01)

(58) Field of Classification Search
  CPC ...... B23P 6/002; B23K 26/362; B23K 26/40; B23K 26/0622; B23K 2203/50; B23K 2201/001; F01D 5/005; Y10T 29/49318; F05D 2230/80; F05D 2230/13
  See application file for complete search history.

(56) References Cited

U.S. PATENT DOCUMENTS

| | | | |
|---|---|---|---|
| 6,370,767 B1 * | 4/2002 | Solberg | H05K 1/0203 29/564.3 |
| 2003/0082048 A1 | 5/2003 | Jackson et al. | |
| 2005/0015980 A1 | 1/2005 | Kottilingam et al. | |
| 2005/0172485 A1 | 8/2005 | Mussen | |
| 2009/0064479 A1 | 3/2009 | Anderson et al. | |
| 2009/0297701 A1 | 12/2009 | Jabado et al. | |
| 2012/0121382 A1 | 5/2012 | Xu et al. | |

FOREIGN PATENT DOCUMENTS

JP   A-2011-256795   12/2011
WO   WO 2008/138300 A1   11/2008

OTHER PUBLICATIONS

Oct. 7, 2014 Search Report issued in European Application No. 14 15 1449.
May 21, 2013 Search Report issued in British Application No. GB 1302428.6.

* cited by examiner

*Primary Examiner* — Richard Chang
(74) *Attorney, Agent, or Firm* — Oliff PLC

(57) ABSTRACT

A repair method for repairing a component (6a) of a gas turbine engine (10). The method comprises first and second steps. The first step comprises directing an energy beam toward the component (6a) to ablate a first region (54) of material to form a gap extending through the component (6a) between a repair region (58) a base region (58) of the component, wherein subsequent to the first step the repair region (58) and base region (56) are joined by a connecting portion (60). In the second step, an energy beam is direct toward the component (6a) to ablate the repair region (58) to remove the repair region (58) from the component (6a).

15 Claims, 2 Drawing Sheets

MATERIAL REMOVAL METHOD

FIELD OF THE INVENTION

The present invention relates to a material removal method. Particularly, though not exclusively, the present invention relates to a material removal method for repairing a component of a gas turbine engine.

BACKGROUND TO THE INVENTION

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts 26, 28, 30.

Gas turbines, and particularly aircraft gas turbines, are relatively high capital cost assets having relatively high value to the customer. Consequently, it is desirable to maintain such gas turbines in situ, such as in a power plant or on the wing of an aircraft, without having to disassemble major assemblies of the gas turbine engine. Such maintenance activities may include removal of a damaged area of a component such as compressor and stator blades of the compressors 13, 14. One method for removing damaged areas while the engine is installed is to mount a laser ablation tool to a flexible or rigid shaft which is inserted into an engine or through a suitable inspection port. The laser ablation tool is then used to ablate a surface of the component to be repaired to remove an area of the component. Such a process is known within the art as "bore blending".

Laser ablation comprises directing a beam of high intensity coherent electromagnetic radiation at a target such as a metal, such that the metal undergoes a phase change from solid directly to gas without undergoing an intermediate liquid phase (i.e. ablation). One method is to use a pulsed laser. US patent US 20120121382 describes one known method of carrying out pulsed laser ablation bore blending.

Unfortunately use of scopes has limitations in terms of their action. It will be understood that steering the distal end to which the laser ablation tool is mounted requires manipulation of the shaft. It is difficult to steer a shaft with an overall length of action which is greater than approximately five meters.

In particular, there are a limited number of access points into an engine and in such circumstances it is quite common to require an abrupt change in direction of the scope in order to gain access to the desired observation point, which may create severe difficulties with regard to jamming of the tool. One component which has been found to be particularly difficult to access using conventional arrangements is the $6^{th}$ stage of the high pressure compressor 14 (HP6). This is particularly problematic, as the HP6 compressor has been found to be subject to damage in use at a relatively high rate.

Due to the difficulty of access for bore blending, the component may not be accessible at a preferred angle for conducting laser ablation. For example, access may only be available from a face of a compressor blade or stator (i.e. a surface extending between the leading and trailing edges of the blade or stator), rather than from other angles as might be desired. Furthermore, it is necessary to prevent pieces from the damaged component from being detached and falling into the engine, where it might cause damage, known as "domestic object damage" (DOD).

A further problem associated with bore blending using laser ablation is the creation of "secondary damage" due to residual effects such as the formation of a heat affected zone (HAZ) on the component by the laser ablation. A HAZ is an area of a metal which has been subjected to high temperatures below the melting point of the metal, but above a critical temperature which may alter the bulk properties of the metal, such as areas adjacent an ablated area of the component. The metal within a HAZ is weakened relative to the bulk material, such that the area adjacent the removed material may have insufficient strength subsequent to the repair. Furthermore, the high temperatures to which the metal within the HAZ is subjected may cause chemical changes to the metal, such as oxidation, which may be undesirable. Any repair performed by conventional laser ablation techniques may therefore be of reduced quality compared to the original component. Alternatively, the laser ablation may have to be carried out at a relatively low "fluence" i.e. radiative flux of the beam integrated over time, resulting in a relatively long process time for ablating a given volume of material.

The present specification describes a repair method which seeks to overcome some or all of the above problems.

SUMMARY OF THE INVENTION

According to a first aspect of the present invention, there is provided a material removal method comprising:

in a first step, directing an energy beam toward a component to ablate a first region of material to form a gap extending through the component between a repair region and a base region of the component, wherein subsequent to the first step, the repair region and base region are joined by a connecting portion; and in a second step directing an energy beam toward the component to ablate the repair region to remove the repair region from the component.

Advantageously, the gap created by the first step prevents the heat from the subsequent ablation of the repair region in the second step from affecting the base region, thereby preventing or substantially reducing the formation of a heat affected zone in the base region of the component. Meanwhile, the presence of a connecting portion between the base and repair regions prevents material from the repair region separating from the base region, which may otherwise lead to domestic object damage. Consequently, the laser ablation can be carried out using parameters chosen to maximise energy deposition in the repair region, while preventing heat from being transferred to the base region.

The gap has a sufficient width to provide a heat barrier between the repair region and the base region during the second step such that substantially no heat affected zone is formed in the base region by the ablation of the repair region. The gap may have a width of less than 1 mm, and may have a width of between 0.5 and 0.1 mm. In one example, the gap may have a width of substantially 0.5 mm.

The connecting portion may have a width sufficient to provide a structural connection between the base region and the repair region such that substantially no material from the repair region is dislodged during the second step. The connecting portion may have a width of less than 1 mm, and may have a width of between 0.5 and 0.1 mm. In one example, the connecting portion may have a width of substantially 0.5 mm.

The first step may be carried out using first beam parameters, and the second step may be carried out using second beam parameters. The beam parameters may be configured such that substantially no heat affected zone is formed in the first region. The beam parameters may be configured such that the resultant heating of the first region is less than the resultant heating of the repair region. Advantageously, the beam parameters ensure that no HAZ is formed in the first region, while allowing more heating of the repair region, which results in faster ablation of the repair region.

The beam parameters may comprise any of incident energy density, beam fluence, beam power, scan speed, pulse repetition frequency, electromagnetic beam wavelength and incident beam diameter. The beam fluence of the first beam may be lower than the beam fluence of the second beam. The first beam parameters may comprise, relative to the second beam parameters, one or more of a relatively low power, a relatively fast scan speed, a relatively high pulse repetition frequency, and a relatively large beam diameter, and the second beam parameters may comprise, relative to the first beam parameters, one or more of a relatively high power, a relatively slow scan speed, a relatively low pulse repetition frequency, and a relatively small beam diameter. Accordingly, one or more beam parameters can be adjusted to provide the required heating of the first and repair regions.

The method may further comprise a third step carried out subsequent to the second step, the third step comprising ablating an edge of the base region subsequent to removing the repair region. The third step may further comprise removing the connection portion. Advantageously, the method can be used to create a required final finish on the edge of the third area, since the initial ablation to form the gap may otherwise leave stress raising features in the repaired area.

The energy beam may comprise an electromagnetic energy beam, and may be provided by a laser such as a pulsed laser.

The method may comprise a repair of a gas turbine engine component, and may be carried out within a gas turbine engine.

According to a second aspect of the present invention there is provided a gas turbine engine component repaired by the repair method of the first aspect of the invention.

According to a third aspect of the invention there is provided a gas turbine engine comprising a component according to the second aspect of the invention.

DETAILED DESCRIPTION

Figure 1:
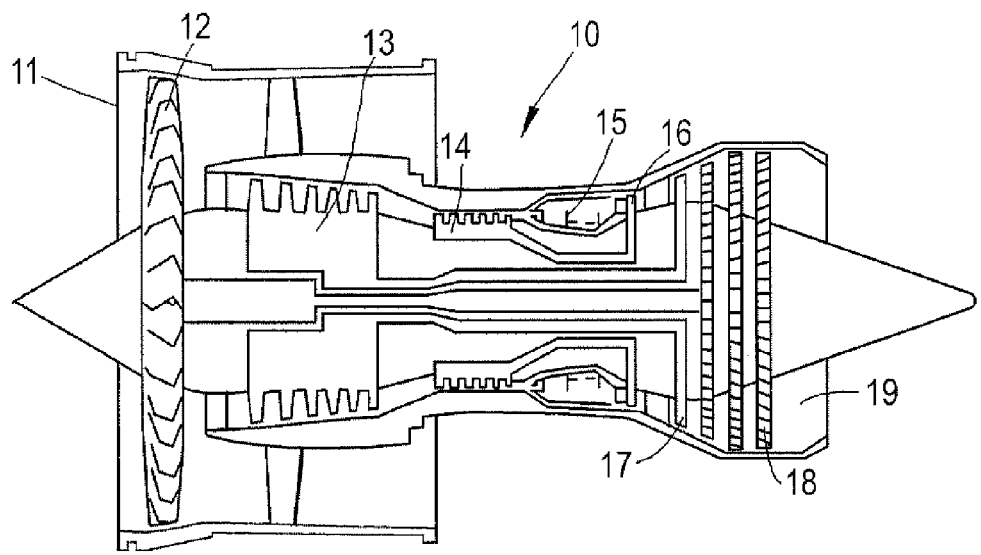
FIG. 1 is a schematic illustration of a gas turbine engine.

FIG. 1 shows a gas turbine engine 10 having, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

In service, it is often necessary to inspect internal components of the gas turbine engine 10. If a defect is found, it may also be desirable to conduct repairs of the internal components without first disassembling the engine 10. Such repair operations are known as "bore blending".

Figure 2:
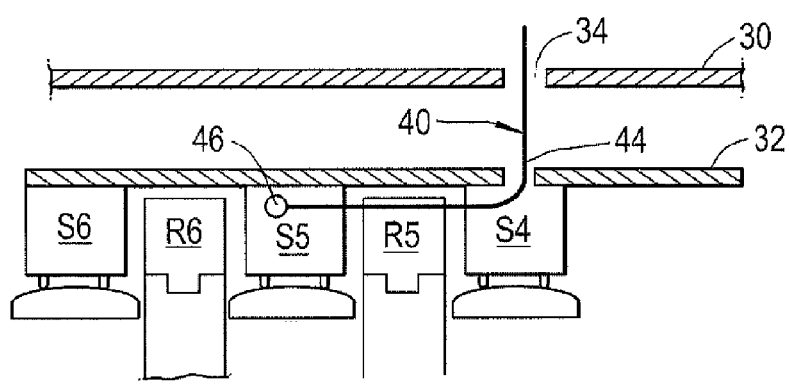
FIG. 2 is a schematic cross sectional side view through part of the gas turbine engine of FIG. 1

In one known gas turbine engine 10, of particular concern are parts of the high pressure compressor 14. A cross sectional side view of part of the high pressure compressor 14 of the gas turbine engine 10 is shown in FIG. 2. The high pressure compressor 14 is contained within a housing comprising outer 30 and inner 32 cases. Both the outer and inner cases 30, 32 include an inspection port 34 through which a repair apparatus 40 (described in further detail below) can be inserted into the interior of the inner case 32 and manoeuvred to a repair location to conduct a bore blending operation. The inspection port 34 comprises an aperture having a sufficient diameter for the repair apparatus 40 to be inserted, and can be sealed off when not in use to allow the compressor 14 to operate.

The high pressure compressor 14 comprises an alternating series of rows of stationary in use stators (generally indicated in FIG. 2 by S4 to S6) and rotating in use rotors (generally indicated in FIG. 2 by R5 and R6). Each row of stators and rotors comprises a plurality of circumferentially arranged blades, such as blade S6a shown in FIG. 3.

In most gas turbine engines, inspection ports are located in several locations. However, it is generally not possible to provide an inspection port adjacent each component to be repaired, particularly in areas such as the high pressure compressor 14. In the example shown in FIG. 2, the inspection port 34 is provided adjacent the fourth stator stage S4. Access to other components of the high pressure compressor 14 through the inspection port 34 must be gained by manoeuvring the repair apparatus 40 between adjacent rows of stator and rotors blades. However, there is often no direct line of sight between the inspection port 34 and the desired observation location. It may therefore be necessary to withdraw the repair apparatus 40, move the rotor to a new position, and reinsert the repair apparatus 40 to perform a bore blending operation on a further rotor blade. In the example shown, a particularly difficult area to inspect through the inspection port 34 is the sixth high pressure rotor and stator stages R6, S6.

The repair apparatus 40 comprises a flexible shaft 44 and an energy beam device in the form of a laser ablation tool 46. The laser ablation tool 46 is configured to produce a pulsed electromagnetic energy beam to ablate the material of the compressor rotor blade R6a, which in this case comprises titanium alloy such as Ti6Al4V alloy. The laser ablation tool 46 may be mechanically and electronically scanned.

Figure 3A:
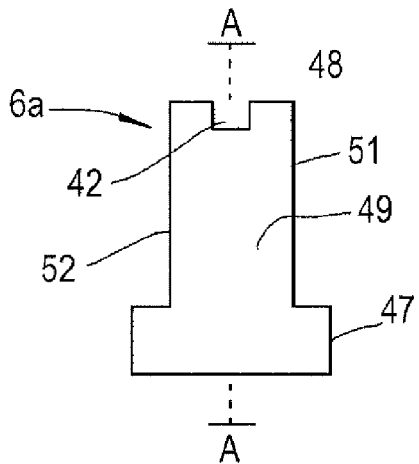
FIG. 3a is a schematic cross sectional side view a gas turbine engine component of the gas turbine engine of FIG. 1.

FIG. 3 shows a schematic representation of a damaged high pressure rotor blade R6a. The blade R6a has a damaged region 42 which requires repair. The damaged region 42 is repaired by removing the damaged region 42 in a material removal method followed by replacement of the damaged material by an additive process such as welding. The blade R6a has a root 47 leading to a tip 48, as well as pressure and suction surfaces 49, 50 each extending between leading and trailing edges 51, 52.

Figure 3B:
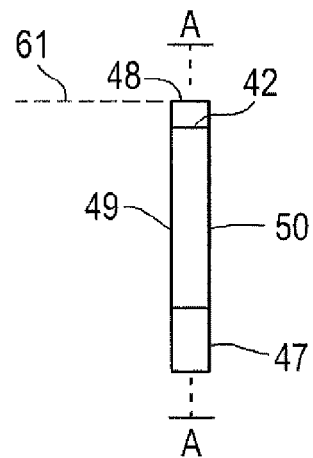
FIG. 3b is a schematic cross sectional view through the component of FIG. 3a along the line A-A.

The repair apparatus 40 is used to perform a material removal method as described below, with reference to FIGS. 3 and 4.

Figure 4A:
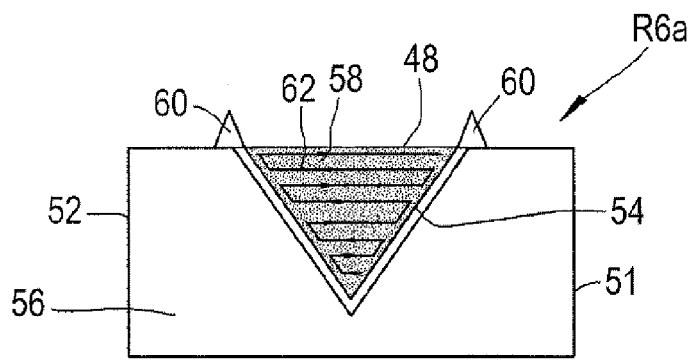
FIG. 4a is a schematic cross sectional side view of part of the component of FIG. 1 after a first repair step has been performed.

In a first step, as shown in FIGS. 2 and 4a, the laser ablation tool 46 is manoeuvred to a required position within the engine 10, such that the tool 46 is able to direct a pulsed energy beam at the damaged region 42. The tool 46 is oriented with the beam direction facing through the face of the blade S6a, i.e. in a direction normal to the plane of the blade defined by the suction or pressure surface 49, 50, and facing the top 48, as shown by dotted line 61 in FIG. 3b. In alternative embodiments, the damaged region could be located on the suction or pressure surface 49, 50, or at the leasing or trailing edges 51, 52, in which case the energy beam would be directed accordingly. An electromagnetic beam is then produced, and directed toward the surface 49 of the blade to ablate and thereby remove a first region of material to form a gap 54. The gap 54 is located between a base region 56 and a repair region 58. The base region 56 corresponds to a portion of the blade R6a extending from the root 47 to a part between the root 47 and the damaged region 42. The repair region 58 corresponds to a portion of the blade R6a extending to the tip 48, and encompassing the damaged region 42 which is to be removed.

The gap 54 extends through the blade from the suction surface 49 to the pressure surface 50. The gap has an arcuate profile when viewed from one of the suction and pressure surfaces 49, 50 to form a "scallop" profile. The gap 54 extends only part way long the border between the base region 56 and repair region 58, from a region approximately 1 millimeter from the tip 48 of the blade S6a at each end of the arcuate profile, such that a pair of connecting portions 60 (shown exaggeratedly in FIGS. 4a and 4b for clarity) are formed between the base and repair regions 56, 58, which structurally connect the base and repair regions 56, 58 together. The connection portion 60 is formed by the material located between the base and repair regions 56, 58 which is not removed in the first ablation step, such that, in general, no material is added to form the connecting portions 60.

The first step is carried out using beam parameters configured to heat the base region 49 and connecting regions 60 to a temperature below the critical temperature at which a HAZ is formed, such that no HAZ is formed in the base of connecting regions 49, 60. For example, the incident beam fluence may be relatively low, such that the temperature of the bulk material is kept relatively low. This may be achieved for example by using a relatively low power laser, and/or by using one or more of a relatively fast scan speed, a relatively high pulse repetition frequency, and a relatively large beam diameter.

Since the first step is carried out in a normal gas filled environment at room temperature and pressure, the gap 54 will fill with air once formed. Alternatively, if the first step is carried out in a vacuum environment, the gap 54 will comprise a vacuum. Consequently, in either case, the gap 54 will provide a thermal barrier between the regions 56, 58. On the other hand, the connecting portions 60 will prevent the repair region 58 from separating from the base region 56, and thereby falling into the engine where it may otherwise cause DOD.

Figure 4B:
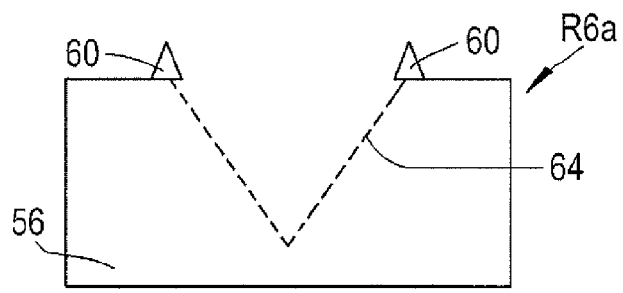
FIG. 4b is a schematic cross sectional side view of the part of the component of FIG. 2 after a second repair step has been performed.
Figure 4C:
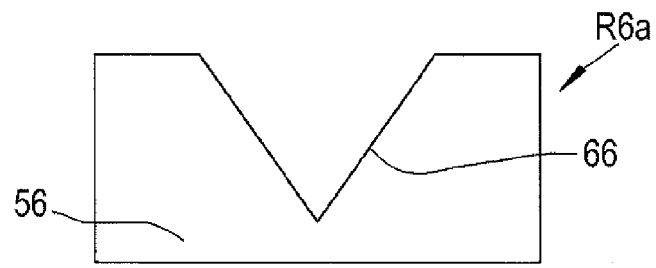
FIG. 4c is a schematic cross sectional side view of the part of the component of FIG. 2 after a third repair step has been performed.

In a second step, as shown in FIG. 4b, the repair region 58 is removed by the laser ablation tool 46 by passing the beam over the surface of the repair region 58 in a raster pattern. In order to prevent excessive stress from being applied to the connecting portions 60, the beam is rastered in a chordal direction (i.e. from the leading edge 49 to the trailing edge 50, or from the trailing edge 50 to the leading edge 49) starting from the side of the repair region 58 closest to the root 47, then moving toward the tip 48, as shown by line 62 in FIG. 4a. Due to the thermal barrier provided by the gap 54, the heat of the beam is prevented from heating the base region 56 to a sufficient extent to cause a significant heat affected zone. Conductive heating of the base region 56 is also prevented by the relatively small width of the connecting portions 60. Consequently, the laser parameters can be chosen to maximise laser energy input into the repair region 58, and thereby minimise the time required to remove the repair region 58. Again, energy may be maximised by applying a relatively high incident beam fluence. This may be achieved for example by using a relatively high power laser, and/or by using one or more of a relatively slow scan speed, a relatively low pulse repetition frequency, and a relatively small beam diameter. The second step could be carried out using a different laser. More conveniently, the second step could be carried out using the same laser as the first step, but using different parameters.

The repair region 58 is thereby removed by laser ablation without leaving any piece of the blade S6a in the engine 10, and without creating a heat affected zone surrounding the repair region 58 in the base region 56.

It has been found that the laser parameters used to form the gap 54 may result in a relatively rough surface finish of the gap, which will be left after the second laser ablation step as shown by dotted line 64 in FIG. 3b. Therefore, in a third step, a further laser ablation pass is made by the laser ablation tool 46 along the edge of the base region 56 to form a final finished edge profile as represented by continuous line 66 in FIG. 3c. During the third laser ablation step, the connecting portions 60 are also removed by the laser ablation tool 46. The third laser ablation step is carried out using laser parameters similar to those used in the first ablation step in order to avoid producing a HAZ in the edge of the base region 54.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

For example, the method could be carried out on different components of a gas turbine engine, such as rotors or stators of turbines 17, 18, 19. Alternatively, the method could be carried out on a component of a different type of machine, such as components for pipes in petrochemical plants or nuclear power installations, where there is a requirement to remove damaged parts of components in a restricted space without either leaving debris in the space or forming a HAZ in the component, and where it is desirable to reduce the time required to remove the damaged parts.

Other types of energy beam sources could be employed, such as electron beams or continuous wave lasers. Other types of material could be ablated, for example other types of metal such as aluminium or aluminium alloy. The apparatus could comprise further tools, such as inspection tools or material addition tools. Different sized gaps could be employed, depending on the material and the environment in which the method is employed. Different parameters could be controlled in order to provide the necessary fluence.

The invention claimed is:

1. A method of repairing a rotor or stator blade of a gas turbine engine, the method comprising:
   in a first step, maneuvering a laser ablation tool within the gas turbine engine to a rotor or stator blade that is to be repaired within the gas turbine engine, and directing an energy beam from the laser ablation tool toward the rotor or stator blade to ablate a first region of material to form a gap extending through the rotor or stator blade between a repair region and a base region of the rotor or stator blade, such that subsequent to the first step, the repair region and the base region are joined by a connecting portion formed by a region of material not removed in the first step; and
   in a second step, directing the energy beam toward the rotor or stator blade to ablate the repair region to remove the repair region from the rotor or stator blade.

2. The method according to claim 1, wherein the gap has a sufficient width to provide a heat barrier between the repair region and the base region during the second step such that substantially no heat affected zone is formed in the base region by the ablation of the repair region.

3. The method according to claim 2, wherein the gap has a width of between 0.1 mm and 1 mm.

4. The method according to claim 3, wherein the gap has a width of approximately 0.5 mm.

5. The method according to claim 1, wherein the connecting portion has a width sufficient to provide a structural connection between the base region and the repair region such that substantially no material from the repair region is dislodged during the second step.

6. The method according to claim 5, wherein the connecting portion has a width of less than 1 mm.

7. The method according to claim 1, wherein the first step is carried out using first beam parameters such that substantially no heat affected zone is formed in the first region.

8. The method according to claim 7, wherein the second step is carried out using second beam parameters.

9. The method according to claim 7, wherein the first beam parameters comprise any of incident energy density, beam fluence, beam power, scan speed, pulse repetition frequency, electromagnetic beam wavelength and incident beam diameter.

10. The method according to claim 8, wherein the first beam parameters comprise, relative to the second beam parameters, one or more of a relatively low power, a relatively fast scan speed, a relatively high pulse repetition frequency, and a relatively large beam diameter, and the second beam parameters comprise one or more of a relatively high power, a relatively slow scan speed, a relatively low pulse repetition frequency, and a relatively small beam diameter.

11. The method according to claim 1 further comprising a third step carried out subsequent to the second step, comprising ablating an edge of the base region.

12. The method according to claim 11, wherein the third step further comprises removing the connecting portion.

13. The method according to claim 1 wherein the energy beam is provided by a pulsed laser beam.

14. The method according to claim 1, wherein a beam fluence of the energy beam in the first step is lower than a beam fluence of the energy beam in the second step.

15. The method according to claim 1, wherein the maneuvering comprises inserting the laser ablation tool through a housing of the gas turbine engine.

* * * * *